UNITED STATES PATENT OFFICE.

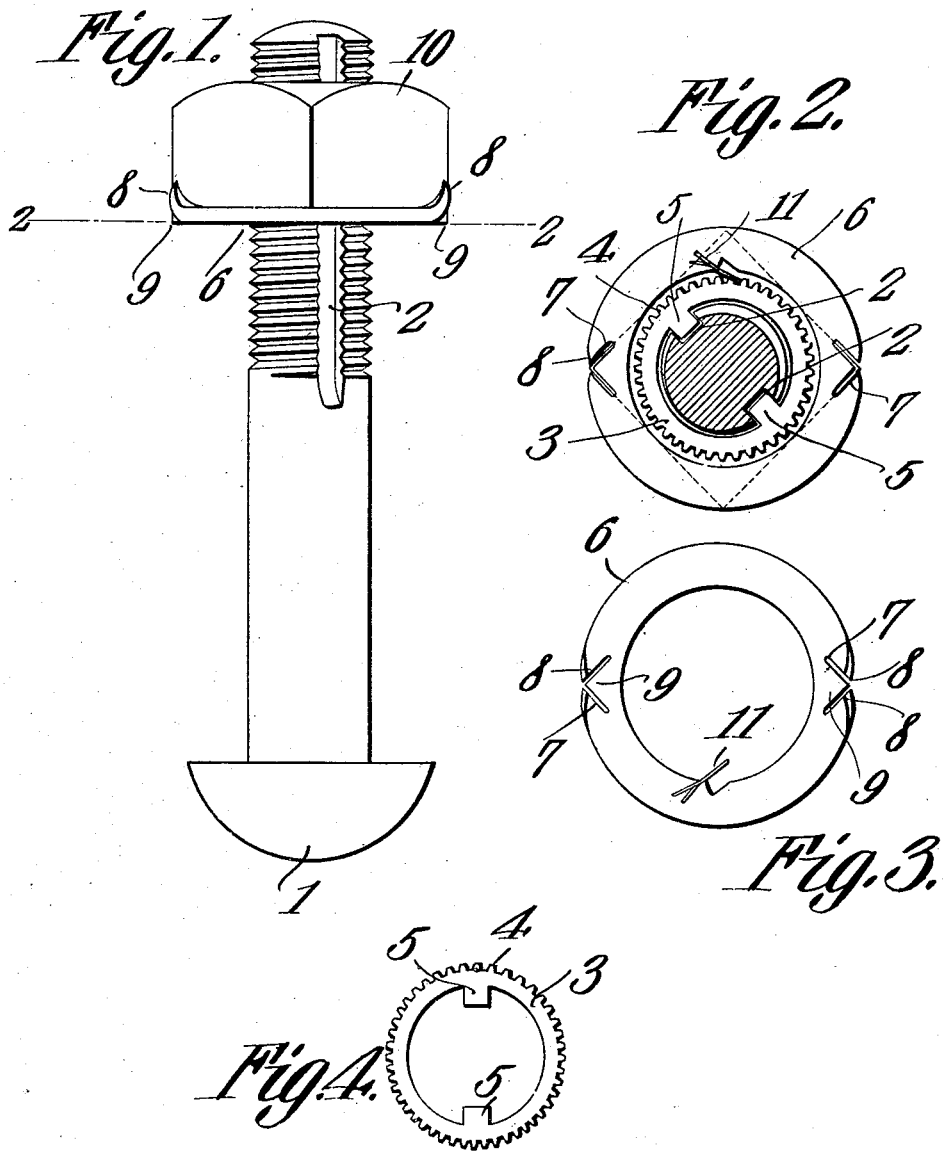

CHARLES W. STARK, OF ASBURY PARK, NEW JERSEY.

NUT-LOCK.

No. 899,080.   Specification of Letters Patent.   Patented Sept. 22, 1908.

Application filed February 14, 1908. Serial No. 415,910.

*To all whom it may concern:*

Be it known that I, CHARLES W. STARK, a citizen of the United States, residing at Asbury Park, in the county of Monmouth and State of New Jersey, have invented a new and useful Nut-Lock, of which the following is a specification.

This invention relates to nut locks and has for its object to provide means by which any nut may be locked on the bolt. Heretofore in most devices of this type, the locking mechanism was carried by the nut and when in the course of time it became necessary to remove the bolt, the device was rendered useless for further use.

The present invention aims to remedy this defect by employing a locking mechanism independent of the bolt and nut, and so constructed that most any form of common nut can be used, and when it is desired to remove the latter, the same can be done without injury to the bolt or nut.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a plan view of the device, showing the parts in operative position. Fig. 2 is a sectional view on the line 2—2 of Fig. 1, showing the position of the parts when the device is locked. Fig. 3 is a detail view of the locking plate. Fig. 4 is a detail view of the locking washer.

Similar numerals of reference are employed to indicate corresponding parts throughout the several figures of the drawings.

A bolt of the ordinary type is provided at one end with the usual head 1 and threaded for a portion of its length from the opposite end in a direction towards the head. On either side of the bolt, and formed diametrically opposite each other are the longitudinal recesses 2 of slightly greater length than the threaded section and forming what is known as a mutilated thread. A metallic washer 3, with a central hole of a diameter sufficient to loosely fit over the bolt, is provided with peripheral teeth 4, and on the inner surface are formed lugs 5 diametrically opposite each other, and of a width sufficient to snugly fit in the recess 2 of the bolt. With this construction it is obvious that when the washer is in place on the bolt, lateral movement or rotation of the washer will be prevented by the lugs coming in contact with the walls of the recess. A circular locking plate 6, preferably stamped from sheet metal, is provided with a central hole of a diameter sufficient to snugly fit over the toothed washer, when the latter is on the bolt, as shown in Fig. 2. On the outer surface of the locking plate there are formed pairs of secant incisions 7, so arranged that, when the plate is in position on the nut, the incisions will be co-terminous with an angle of said nut. These secant incisions form bearing portions 9 lying between the incisions and jaws or lugs 8 lying between the outer periphery of the plate and each of the incisions.

On the interior surface of the locking plate 6 is formed a recess for the reception of the spring pawl 11, the latter having one end secured in the recess, and its free end projecting beyond the inner surface and designed when the latter is covering the toothed washer to contact with the teeth formed on the periphery of the latter, as clearly shown in Fig. 2. In the use of the device, the bolt is first inserted through the aperture formed in the metal or wood, and over the threaded end protruding from the aperture is placed the toothed washer 3, the lugs 5 of which pass into the grooves 2 of the bolt. The nut is then placed in position on the locking plate, so that the jaws or lugs 8 rest against the sides thereof and the nut and plate are turned upon the end of the bolt until the locking plate 6 projects into the plane of the toothed washer 3. The free end of the spring pawl 11 will engage the teeth 4 of the washer and prevent the nut being turned only in the direction to screw it tightly on the end of the bolt. The nut cannot work loose so long as the free end of the pawl engages the teeth 4.

What is claimed is:—

1. In a nut lock, a nut, a bolt, a locking plate substantially circular in outline provided with a plurality of pairs of secant incisions, each pair forming an angle coterminous with one of the angles of said nut and having portions exterior of each pair of the incisions upwardly bent to engage two adjacent sides of said nut, and interlocking means carried by said bolt and locking plate.

2. In a nut lock, a nut, a bolt, a locking plate substantially circular in outline provided with a pair of secant incisions forming an angle coterminous with an angle of said nut and having portions exterior of said incisions upwardly bent to engage two adjacent sides of said nut, a pawl carried by said locking plate, and means carried on said bolt adapted to be engaged by said pawl and prevent the rotation of said nut in one direction.

3. In a nut lock, a nut, a bolt, a locking plate substantially circular in outline provided with a pair of secant incisions forming an angle coterminous with an angle of said nut and having portions exterior of said incisions upwardly bent to engage two adjacent sides of said nut, a locking washer held on said bolt against rotation and provided with a peripheral series of teeth, and a pawl on said locking plate arranged to engage said teeth.

4. In a nut lock, a nut, a bolt, a locking plate substantially circular in outline provided with a plurality of pairs of secant incisions each pair forming an angle coterminous with one of the angles of said nut and having portions exterior of each pair of the incisions upwardly bent to engage two adjacent sides of said nut, a pawl mounted on said locking plate and teeth supported by said bolt to engage said pawl and to prevent rotation of said nut in one direction.

5. In a nut lock, a nut, a bolt, a locking plate substantially circular in outline provided with a plurality of pairs of secant incisions each pair forming an angle coterminous with one of the angles of said nut and having portions exterior of each pair of the incisions upwardly bent to engage two adjacent sides of said nut, a washer mounted upon said bolt provided with a peripheral series of teeth, and a pawl carried by said washer adapted to engage said teeth.

6. In a nut lock, a nut, a bolt, provided with a pair of longitudinally disposed recesses, a locking plate substantially circular in outline provided with a pair of secant incisions forming an angle coterminous with an angle of said nut and having portions exterior of said incisions upwardly bent to engage two adjacent sides of said nut, a washer provided with a pair of internal lugs engaging the recesses of said bolt and having peripheral teeth formed thereon, and a pawl carried by said locking plate adapted to engage said ratchet teeth.

7. In a nut lock, a nut, a bolt provided with longitudinal recesses, a locking plate substantially circular in outline provided with a plurality of pairs of secant incisions, each pair forming an angle coterminous with one of the angles of said nut and having portions exterior of each pair of incisions upwardly bent to engage two adjacent sides of said nut, a washer mounted upon said bolt provided with a pair of internal lugs adapted to engage the recesses in said bolt and having external teeth, and a pawl carried upon said locking plate adapted to engage said ratchet teeth.

In testimony that I claim the foregoing as my own, I have hereto affixed my signature in the presence of two witnesses.

CHARLES W. STARK.

Witnesses:
JOHN H. DEWIS,
WM. P. SHERMAN.